United States Patent
Peake

[11] 3,711,769
[45] Jan. 16, 1973

[54] SPURIOUS SIGNALS AND INTERMODULATION PRODUCTS DETECTION ENHANCEMENT CIRCUIT

[75] Inventor: Murray W. Peake, Laureldale, Pa.

[73] Assignee: The United States of America as represented by the Secretary of the Army

[22] Filed: March 9, 1971

[21] Appl. No.: 122,390

[52] U.S. Cl. .............................. 324/57 N, 324/58 A
[51] Int. Cl. .......................................... G01r 27/00
[58] Field of Search ..324/57 R, 57 N; 3/58 SA, 58 A

[56] References Cited

UNITED STATES PATENTS 2,143,094  1/1939  Swift .................................. 324/57 N
2,988,693  6/1961  Billig et al. ........................... 324/57 N
3,265,967  8/1966  Heald .................................. 324/58 A
3,241,062  3/1966  Baird ..................................... 324/61
3,399,345  8/1968  Cohn ..................................... 324/84

Primary Examiner—Stanley T. Krawczewicz
Attorney—Charles K. Wright, William G. Gapcynski, Lawrence A. Neureither, Leonard Flank, Williams P. Murphy and Robert C. Sims

[57] ABSTRACT

A test system where a fundamental signal is sent through a unit to be tested and at the same time this signal is sent around said unit to be tested and shifted a 180° in phase with respect to output of unit. The two signals are then combined to eliminate the fundamental, and the spurious signal is measured by a spectrum analyzer.

4 Claims, 3 Drawing Figures

Murray W. Peake,
INVENTOR.

SPURIOUS SIGNALS AND INTERMODULATION PRODUCTS DETECTION ENHANCEMENT CIRCUIT

BACKGROUND OF THE INVENTION

This invention is directed to the field of measuring and testing. More particularly this invention is related to the measuring of spurious or harmonic components in the output of the unit to be tested. Some of the prior art attempted to measure the spurious signals without suppression of the primary signal. The spurious signals are relatively low level signals when compared with the primary signal; therefore, many difficulties were present in the prior art devices which tried to measure these spurious signals in the presence of the fundamental signal. Thus, it becomes necessary to cancel the primary signal from the output of the test device. Other prior art devices suppressed the fundamental signal by the use of a filter; however, this proved to be undesirable since spurious signals close in frequency to the primary signal were not detected.

SUMMARY OF THE INVENTION

A plurality of oscillators are provided to be connected to the switching system. The switching system selects one or more oscillators and connects them to a unit which is to be tested. The switching system also connects the signal from the oscillators to a circuit in parallel with the unit to be tested. This circuit is made up of a phase shifter connected in series with an isolator. The output from this circuit and the output from the unit under test are combined in an amplitude amplifier balanced circuit. With proper adjustment of the phase shifter and the balanced circuit the output of the balanced circuit will be free of the primary signals from the selected oscillators and will contain only the spurious signals generated by the unit under test. These spurious signals are sent to a spectrum analyzer and a power meter for measurement. The system could be modified by coupling each selected oscillator to the unit to be tested and by providing a parallel circuit for each oscillator. Each of these parallel circuits will contain a phase shifter and an adjustable amplitude balance circuit means. The output of these parallel circuits will be coupled together and fed to an isolator. The output of the isolator will be coupled with the output from the unit under test. As before each phase shifter is adjusted such that it will be 180° out of phase with the primary signal coming from the unit.

DESCRIPTION OF THE PREFERRED EMBODIMENT

Figure 1:
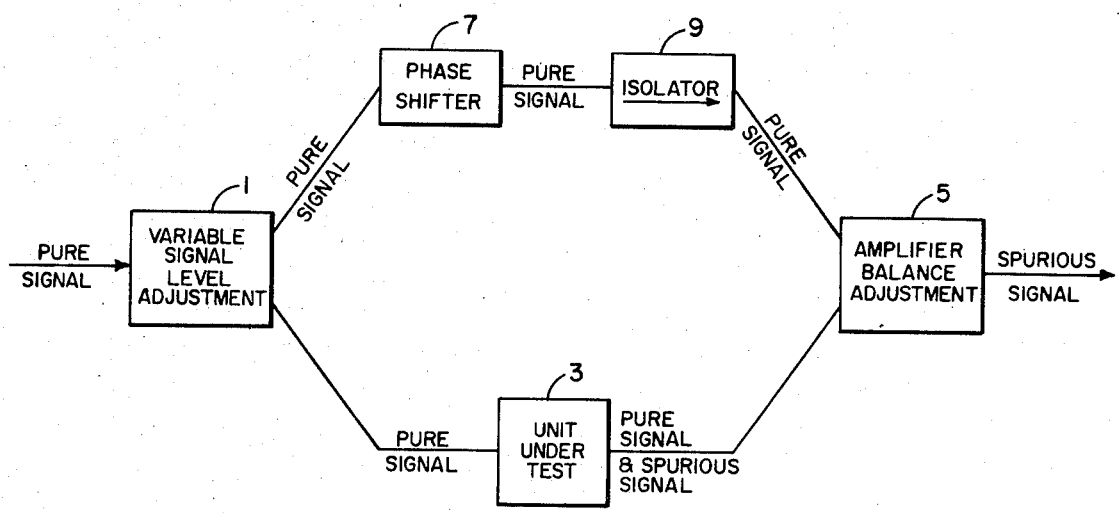
FIG. 1 is a block diagram showing the basic concept of the invention.

The basic concept of the invention is shown by FIG. 1. In FIG. 1 a pure signal from a source not shown is fed to a variable signal level adjustment means 1. The signal is split by means 1 and pure signal is sent along two parallel paths. The first path is sent to the unit 3 to be tested. The output of this unit under test will contain both pure signal and spurious signals caused by the unit under test. These are fed to a combining means or amplifier balance adjustment means 5. The second path contains a phase shifter 7 and an isolator 9. The output will be a pure signal but shifted 180° in phase with respect to pure signal output from unit 3. This output is also fed to amplifier balance adjustment means 5. Amplifier balance adjustment means 5 combines the signals from the two paths, adjusts their amplitudes, and since the pure signal from path 1 is 180° out of phase with the pure signal coming from path 2, the output of means 5 will contain only the spurious signals caused by the unit under test. This is very desirable when one wants to analyze the spurious signals generated by a unit which is to be tested, as if a large pure signal was present along with the spurious signal it would be most difficult to measure the low level spurious signals. As can be seen from FIG. 1, what is formed is a phase bridge in which the pure signal is canceled out. Both paths of this phase bridge should be of equal electrical length for simultaneous balance of more than one pure signal, as an unbalance will allow the nulling of only one signal at a time.

Figure 2:
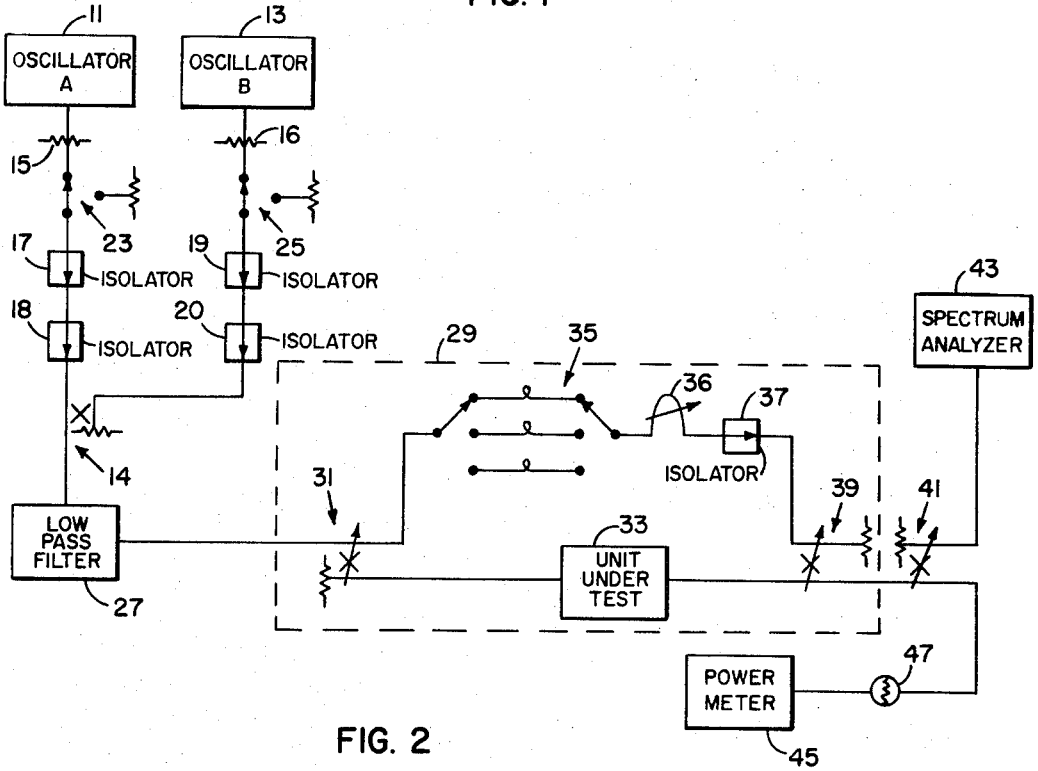
FIG. 2 is a schematic diagram of one preferred embodiment of the invention.

FIG. 2 shows a more detailed embodiment of the invention. Oscillators 11 and 13 are shown connected to coupler 14 by way of attenuators 15 and 16, isolators 17-20, and switch means 23 and 25. Coupler 14 may be a three decible coupler or a hybrid coupler. The output of coupler 14 is fed through low pass filter 27 to the phase bridge network 29. Phase bridge network 29 contains signal level adjustor 31 which splits the signal from 27 into two paths. One path contains the unit under test 33. The other path contains coarse phase balancer 35 and fine phase balancer 36 which preform the function of inverting the phase of the signal 180° with respect to output from unit 33. An isolator 37 is provided in this path so as to prevent back mixing of the signals of the two paths. The output of the two paths are fed to amplitude balance circuit means 39, which may be any of the known amplitude balance combining devices. The output of amplitude balance circuit 39 is fed to signal level to analyzer adjustment means 41 which splits the signal and sends it to spectrum analyzer 43 and to power meter 45 by way of coupler 47.

In the operation of FIG. 2 either oscillator A or oscillator B may be selected separately or together by means of switches 23 and 25. More than two oscillators may be provided along with appropriate switches, isolators, and couplers. Terminators are provided for switches 23 and 25 so that there will be no interference when only one oscillator is selected to be fed to the phase bridge 29. These signals from the oscillators are fed through coupler 14 through low pass filter 27 and to phase bridge 29. Signal level adjustment means 31 splits the signal and sends pure signal to the unit under test. The output of the unit under test will contain both pure signal and spurious signals caused by the unit under test, and this signal is sent to amplitude balance network 39. Pure signal is also sent through the coarse phase balancer and the fine phase balancer where it will be adjusted to be inverted 180° with respect to the pure signal in the output of unit 33. This signal is fed through isolator 37 to amplitude balancer 39 also. The amplitude balance 39 is adjusted so that the pure signal is canceled from its output, and only the spurious signals from the unit under test will be sent as the output of the phase bridge. This spurious signal is then analyzed by spectrum analyzer 43, power meter 45, and any other desired measured means not shown. It should be noted that although only two oscillators are shown in FIG. 2 any number of oscillators may be coupled to the low pass filter 27 in the same manner as oscillator 13 is coupled. Both paths of the phase bridge 29 are of equal electrical length so as to allow for simultaneous balance of more than one input signal. The amplitude balance means 39 is of the type that will not change its phase length when adjusted.

Figure 3:
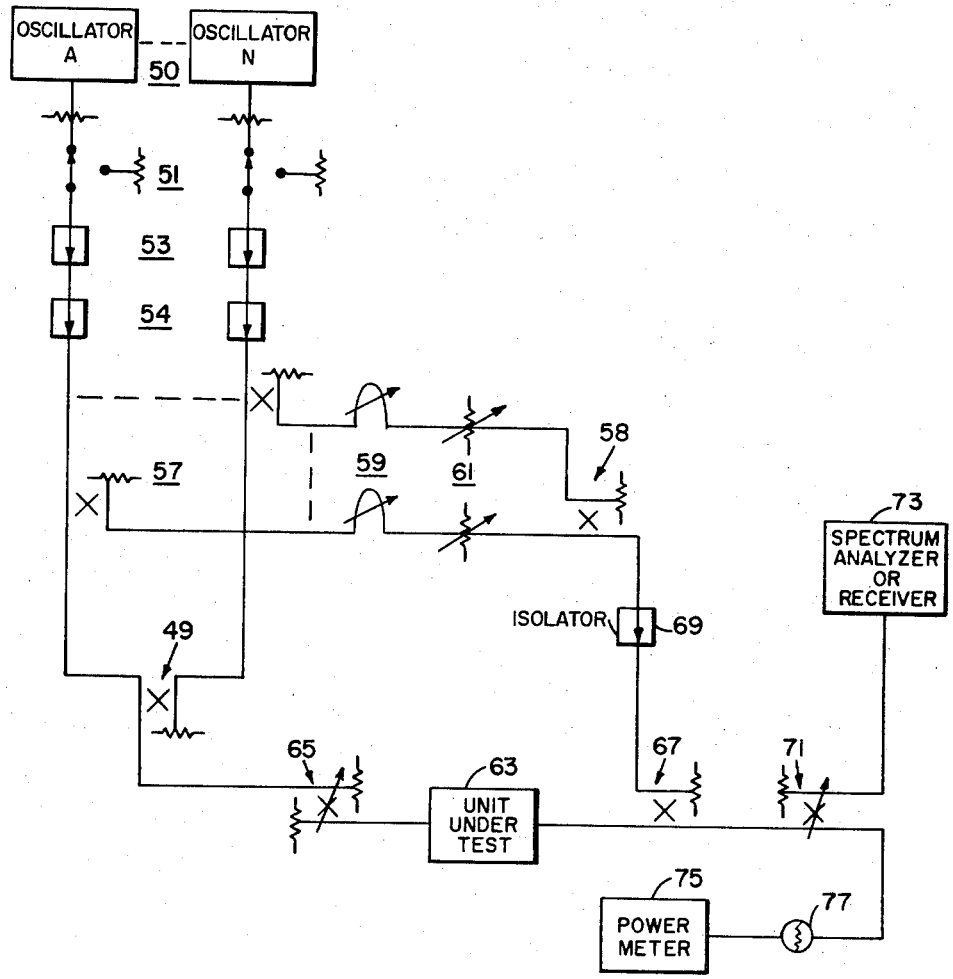
FIG. 3 is a schematic diagram of another preferred embodiment of the present invention.

The circuit of FIG. 2 is very desirable when only one or two oscillators are to be used. However, when more than two oscillators are to be used or the unit under test varies in phase length from one unit to another, the circuit of FIG. 3 is more practical. FIG. 3 shows a plurality of oscillators A-N each connected to coupler 49 by way of attenuators 50, switches 51 and isolators 53 and 54. A plurality of couplers 49 may be used to couple the outputs of oscillators B-N to the output of oscillator A. Couplers 57 couple the signals from oscillators A-N to coupler 58 by way of phase balance means 59 and amplitude balance means 61. A plurality of couplers 58 may be provided to couple each path to isolator 69. The signal from coupler 49 is fed to the unit under test 63 by way of signal level to unit under test adjustment means 65. The output from coupler 58 is fed to combining means or coupler 67 by way of isolator 69, and the output from unit under test 63 is also fed to coupler 67. Signal level adjustment means 71 couples the spurious signals from coupler 67 to spectrum analyzer or receiver 73 and to power meter 75 by way of connector 77.

The operation of FIG. 3 is essentially the same as the operation of FIG. 2. Any number of the oscillators signals A-N are connected to the phase bridge by switches 51, isolators 53 and 54, and couplers 49 and 57. The desired signal level is adjusted by means 65 and fed to the unit under test 63. After the signal has passed through unit 63 the output contains both the signals from the selected oscillators A-N and spurious signals which were added by the unit under test. These are connected to one input of coupler 67. The phase balance means 59 of the selected oscillators are adjusted so that the phase of the primary signal presented to the other input of coupler 67 is 180° out of phase with respect to the phase of the primary signals presented to coupler 67 by the unit under test 63. It should be noted that phase balancers 59 are adjusted to provide a phase shift of a 180° with respect to the phase output of the unit under test 63 and not with respect to the phase of the selected oscillators A-N. Amplitude balance means 61 are adjusted such that the output of coupler 67 will contain only the spurious signals generated by the unit under test. The output from coupler 67 may be connected to any desired testing means such as spectrum analyzer 73 and power meter 75.

The unit under test could be a transistor amplifier in which one wants to test the third order intermodulation products of more than 50 decibles down from the fundamental which are closely spaced. The unit under test could also be a reciever which needs to be tested in the presence of strong outside signals.

I claim:

1. A testing circuit wherein the improvement comprises signal means; adjustable phase shifted means; unit means; combining means; said adjustable phase shifting means and said unit means each having one end connected to said signal means to recieve at least one signal therefrom; said adjustable phase shifting means and said unit means having their other end connected to said combining means; utilization means connected to the output of said combining means; said adjustable phase shifting means being adjusted such that the phase of the signal presented by said signal means through the phase shifting means to the combining means is 180° out of phase with respect to the phase of the signal presented by the signal means to the combining means by way of said unit means; an isolator means connected between said adjustable phase shifting means and said combining means; at least first and second frequency signal producing means make up said signal means; coupling means; a plurality of isolating means connecting said frequency signal producing means to said coupling means; and said coupling means being connected to said unit means and said adjustable phase shifting means.

2. A testing circuit as set forth in claim 1 further comprising switching means connected to the frequency signal producing means whereby one or more frequency signal producing means may be selectively connected to said coupling means; signal level adjustment means having an input and two outputs; filter means connected between said coupling means and the input of said signal level adjustment means; one output of said signal level adjustment means being connected to said adjustable phase shifting means and the other output being connected to said unit means; said unit means being the unit which is to be tested; said combining means being an adjustable amplitude balancing means having two inputs and one output; said adjustable phase shifting means and said adjustable amplitude balancing means each being adjusted such that the signals from said frequency signal producing means are canceled and only a spurious signal produced by said unit means is presented to the output of said adjustable balancing means; the electrical path through said phase shifting means and said isolator means being equal to the electrical path through said unit means; and said utilization means being at least one indicating device.

3. A testing circuit wherein the improvement comprises signal means; adjustable phase shifted means; unit means; combining means; said adjustable phase shifting means and said unit means each having one end connected to said signal means to receive at least one signal therefrom; said adjustable phase shifting means and said unit means having their other end connected to said combining means; utilization means connected to the output of said combining means; said adjustable phase shifting means being adjusted such that the phase of the signal presented by said signal means through the phase shifting means to the combining means is 180° out of phase with respect to the phase of the signal presented by the signal means to the combining means by way of said unit means; an isolator means connected between said adjustable phase shifting means and said combining means; said signal means is made up of a plurality of frequency signal producing means; first connecting means connecting the signal from said plurality of frequency signal producing means to said unit means; additional adjustable phase shifting means; second connecting means connecting said plurality of frequency signal producing means individually to the adjustable phase shifting means; and third connecting means connecting each of the adjustable phase shifting means to said isolating means.

4. A testing circuit as set forth in claim 3 further comprising a plurality of switch means; a plurality of isolating means; said plurality of switching means and isolating means being series connected between the plurality of frequency signal producing means and first and second connecting means; a signal level adjusting means connected between said first connecting means and said unit means; a plurality of adjustable amplitude balancing means connected between said plurality of adjustable phase shifting means and said third connecting means; said combining means being an adjustable amplitude balancing means having two inputs and an output; each adjustable phase shifting means and adjustable amplitude balancing means being adjusted such that the individual frequency signals produced by said plurality of frequency producing means are canceled in said combining means and the output of the combining means being only the spurious signals produced by the unit means; and said utilization means being at least one indicating device.

* * * * *